Patented Sept. 27, 1938

2,131,419

UNITED STATES PATENT OFFICE 2,131,419

INSOLUBLE ANTHRAQUINONE COMPOUNDS IN CONCENTRATED FORM

Wilbert A. Herrett, Hamburg, N. Y., assignor to National Aniline & Chemical Company, Inc., New York, N. Y., a corporation of New York No Drawing. Application December 14, 1935, Serial No. 54,512

5 Claims. (Cl. 260—303)

This invention relates to the manufacture of insoluble anthraquinone compounds in the form of concentrated filter cakes, pastes, and the like. It relates more particularly to an improved process whereby insoluble anthraquinone compounds, and especially anthraquinone vat dyes, in the form of filter cakes, pastes and the like containing a high concentration of dyestuff, can be obtained directly from solutions of said compounds in concentrated sulfuric acid. The invention also includes the insoluble anthraquinone compounds in the novel physical form resulting from the improved process.

In the manufacture of anthraquinone vat dyes, or other insoluble anthraquinone compounds used as dyestuffs, pigments or intermediates for other products, the insoluble anthraquinone compound is often produced in the form of a precipitate in suspension in a mother liquor from which it is separated by filtration or other mechanical procedure, and the resulting filter cake or other mass of separated solid is in the form of a wet thick mass or so-called paste containing a large amount of liquid. For the production of so-called dyestuff pastes, the dyestuff filter cake or other mass is agitated, with or without the addition of other materials such as thinning, wetting and/or dispersing agents, and adjusted to a standard concentration of dyestuff.

It is known to purify and modify and/or control the particle size and/or crystal structure of anthraquinone vat dyestuffs and other anthraquinone compounds insoluble in dilute sulfuric acid by dissolving them in strong sulfuric acid or oleum and reprecipitating them by dilution of the resulting solution. This procedure is termed "acid pasting". It is also known that for each anthraquinone vat dyestuff or other insoluble anthraquinone compound the procedure must be controlled as to concentrations of acid and solution, temperature, rate of precipitation, etc. to obtain the dyestuff or compound in the particular physical form which best permits it to be further processed or, in the case of the dyestuffs, to be standardized as a uniform paste which conforms in dyestuff content, fluidity, dispersibility and other properties with existing optimum commercial standards.

As heretofore obtained by mechanical separation of the vat dye particles from the mixture of particles and dilute sulfuric acid resulting from the acid pasting procedure (as by filtration, centrifugation, decantation, sedimentation, etc.), the concentration of dyestuff in the separated product is relatively low. For example, by dissolving in concentrated sulfuric acid the anthraquinone vat dyestuff herein identified as Flavine GC (a crystalline yellow anthraquinone vat dyestuff which dyes cotton from a hydrosulfite vat a strong bright yellow and which is obtainable by heating 2,6-diaminoanthraquinone with sulfur and benzal chloride in accordance with German Patent 267,523), pouring the resulting solution rapidly into sufficient ice and water to reduce the sulfuric acid concentration to about 10 per cent, filtering the resulting slurry on a suction filter (nutsch), washing the filter cake free of acid with water and drawing off removable water by maintaining the suction for 12 hours a filter cake is produced which is in the form of a thick, pasty mass containing only about 12½ per cent of solid material, the remainder being water (notwithstanding the extended application of suction to the washed filter cake). In the case of certain anthraquinone vat dyestuffs, filter cakes and other similar masses of separated solid dyestuff particles are obtained containing as high as about 25 per cent of the solid dyestuff particles. For this reason anthraquinone vat dye pastes formerly appeared on the market generally in the form of 10 per cent or 20 per cent pastes. These pastes have the evident disadvantage that they contain a very large proportion of an inert ingredient, water, which adds greatly to the cost of transportation, packaging and ultimate cost of actual dyestuff to the consumer.

A number of procedures have been proposed having for their object a reduction of the water content of the pastes. For example, more concentrated pastes have been produced by evaporation of water from the said pastes or by further treatment of the filter cakes or pastes to cause them to release a portion of the water held by them, followed by mechanical separation of the released water. These procedures have the disadvantage, however, that they require an additional treatment of the filter cake or other masses resulting from the filtration or other mechanical separation of the solid particles, thereby adding to the cost of the finished product.

An object of the present invention is to provide a procedure whereby insoluble anthraquinone compounds may be precipitated from their solutions in sulfuric acid in a form adapted to be directly converted to press-cakes, pastes or other suspensions containing high concentrations of the insoluble anthraquinone compounds, without requiring an additional concentrating treatment thereof.

Another object of the invention is to provide a modification of the acid pasting treatment of anthraquinone vat dyestuffs whereby filter cakes, pastes and the like may be directly obtained, as a result of the acid pasting process, containing a higher concentration of anthraquinone vat dyestuff than are obtained as a result of the acid pasting processes heretofore practiced.

Other objects of the invention will in part be obvious and will in part appear hereinafter.

I have found, if the solution of an insoluble anthraquinone compound in sulfuric acid (which term will hereinafter be employed in its broad sense including oleum), from which the anthraquinone compound is to be obtained by dilution of the solution, also contains in solution an alkali metal sulfate such as sodium hydrogen sulfate, the anthraquinone compound which precipitates upon dilution of the solution is in a form having a lesser tendency to retain water than the anthraquinone compounds similarly precipitated in the absence of the alkali metal sulfate. I have further found that the anthraquinone vat dyestuff precipitates which are obtained with the aid of the alkali metal sulfate can be further subjected to any treatment which does not alter the physical structure of the dyestuffs without loss of their advantageous properties. For example, they can be separated in the known manner from the resulting diluted mixtures by the ordinary processes of filtration and washing to produce filter cakes having all of the desirable properties of the ordinary anthraquinone vat dyestuff pastes; they can be mixed with various known thinning, diluting and modifying agents, printing and dyeing assistants, stabilizing agents, and the like, to form anthraquinone vat dyestuff pastes or printing pastes for use in dyeing or printing; and they can be evaporated to dryness with or without the addition of other materials in the same manner as the anthraquinone vat dye pastes produced by the known acid pasting procedures. Without limiting the invention to any theoretical explanation, it appears that the presence of the alkali metal sulfate in the sulfuric acid solution results in the precipitation of the anthraquinone vat dyestuffs or other insoluble anthraquinone compounds in a novel, advantageous physical form.

As a result of this discovery, it becomes possible by simple and direct means to obtain anthraquinone vat dyestuffs and other insoluble anthraquinone compounds in the form of filter cakes, pastes, or other products, containing a high concentration of the anthraquinone compound per unit volume or weight, while still retaining the advantageous properties inherent in products resulting from the acid pasting procedure. The invention contributes a distinct improvement to the art of manufacturing marketable vat dyestuffs in wet or dry form at a distinct saving in cost through much lower requirements of space, time, power and labor, as well as in the cost of transportation and packaging of pastes.

As illustrative embodiments of a manner in which the invention may be carried into practice, and of the products produced, the following examples are presented. The parts are by weight and the temperatures are in degrees centigrade.

*Example 1.*—To a solution of sodium hydrogen sulfate in sulfuric acid, produced by dissolving 20 parts of anhydrous sodium sulfate in 200 parts of sulfuric acid monohydrate (100 per cent sulfuric acid) at ordinary room temperature, there were added at ordinary temperature 20 parts of the crude vat dyestuff obtained by condensing 2,6-diaminoanthraquinone with sulfur and benzal chloride in accordance with the procedure of German Patent 267,523. The mixture was stirred until the dyestuff was completely dissolved. The resulting solution was then run rapidly into 2000 parts of water and ice, as a result of which the dyestuff precipitated. The precipitate was filtered on a suction filter, and the filter cake was washed with water until free of acid and then subjected to vacuum suction while still on the filter for about 2 hours, to remove available water. The resulting filter cake weighed 73 parts and contained 20 parts of dye solids. It was readily converted into a fluid dyestuff paste having the usual properties of vat dye pastes, and having the advantage of greatly increased concentration of dye solids, by mixing with 2 parts of "Leukanol" in the known manner. ("Leukanol" is a formaldeyhde condensation product of naphthalene sulfonic acid.) By duplicating the foregoing procedure in every respect but omitting the sodium sulfate, there was obtained 173 parts of a filter cake containing 20 parts of dye solids, which when mixed with 2 parts of Leukanol yielded a fluid paste having a concentration of only 12.6 per cent solids as compared with the concentration of 29.3 per cent solids of the concentrated paste.

*Example 2.*—A mixture of 200 parts of 95 per cent sulfuric acid, 20 parts of 4,4'-di(benzoylamino)-1,1'-dianthrimide and 20 parts of anhydrous sodium sulfate was stirred at ordinary room temperature until solution was complete. The resulting solution was warmed to about 50° and then poured into an aqueous solution of 4.5 parts of sodium nitrite in 550 parts of water which was at a temperature of about 20° to effect oxidation and precipitation of the dyestuff. The resulting slurry was then further diluted by mixing with a solution of 4.5 parts of sodium nitrite in 185 parts of water. The resulting dilute slurry was maintained for about 3 hours at a temperature of about 60° to about 75° to complete the oxidation and then filtered. The filter cake was washed free of acid on the filter and then subjected to vacuum suction for about 2 hours to remove available water. There was thus produced 66 parts of a filter cake of Carbanthrene Olive R (Color Index No. 1,150) containing 20.5 parts of the vat dyestuff. By duplicating the procedure of this example in every respect but omitting the sodium sulfate from the sulfuric acid solution of the dianthrimide, there was obtained 109 parts of a filter cake containing 20.3 parts of vat dyestuff. In terms of per cent, the concentrated filter cake contained 31 per cent dye solids and the filter cake made in the absence of the sodium sulfate had a concentration of 18.6 per cent dye solids.

It will be realized that the invention is not limited to the products or to the processes and the details thereof set forth in the foregoing examples. Thus, the process may be employed for the preparation of other anthraquinone vat dyestuffs in the advantageous form, such as those of the indanthrone (especially chlorindanthrone), flavanthrone, dibenzanthrone and other series; as for example, Carbanthrene Blue BCS, Color Index No. 1,114; Carbanthrene Yellow G, Color Index No. 1,096; Carbanthrene Violet 2R, (dichloriso-dibenzanthrone) Color Index No. 1,104; Carbanthrene Brown AR, Color Index No. 1,151.

Further, the invention is not limited to the production of concentrated filter cakes, pastes and the like of anthraquinone vat dyestuffs, but may be employed for the production of concentrated filter cakes, pastes and the like of other anthraquinone compounds which are insoluble in dilute sulfuric acid, including those which are not dyestuffs although they are useful as intermediates for the production of dyestuffs and the like, as for example, anthraquinone, alizarine, quinizarine, chlor-methyl-anthraquinone, etc.

The process may be employed for the production of the anthraquinone vat dyestuffs or other insoluble anthraquinone compound as a step in the manufacture thereof, as a step in the purification thereof, or in connection with the separate acid pasting thereof.

The sodium sulfate may be incorporated in the sulfuric acid solution of the insoluble anthraquinone compound at any stage prior to the precipitation thereof by dilution. Thus it may be added before or after the insoluble anthraquinone compound is dissolved in the sulfuric acid, or while the insoluble anthraquinone compound is being dissolved in concentrated sulfuric acid.

The sodium sulfate may be incorporated into the sulfuric acid solution in any suitable manner and in any suitable form. Thus, sodium bisulfate (sodium hydrogen sulfate) or normal sodium sulfate (ordinary sodium sulfate) may be added as such or may be formed in the solution, e. g., by the reaction of the sulfuric acid with salts or other compounds adapted to form a sodium sulfate by reaction with sulfuric acid without reacting with the dissolved anthraquinone compound. Presumably the sodium sulfate employed in the above examples forms sodium bisulfate upon dissolving in the sulfuric acid. It will be observed, however, that the sodium sulfate and the dyestuff both should be in solution in the sulfuric acid prior to dilution of the solution to precipitate the dyestuff. The temperature at which the sodium sulfate is incorporated into the sulfuric acid solution is not important; it may be added at any temperature which suits the convenience of the remainder of the process.

The amount of sodium sulfate employed may vary widely. For a satisfactory increase in concentration of the resulting vat dyestuff product, an amount of sodium salt equivalent to at least 2½ per cent by weight of sodium bisulfate (NaHSO₄), based on the weight of the sulfuric acid (or oleum), should be present in the solution before dilution. Preferably an amount of sodium salt corresponding with about 8½ per cent of sodium bisulfate based on the weight of the sulfuric acid is employed. While a greater amount of the sodium sulfate may be employed, including amounts which will not dissolve in the sulfuric acid, there is ordinarily no advantage in the use of such large amounts.

The invention is not limited to the use of sodium sulfates, but includes the use of other alkali metal sulfates; as for example, potassium and ammonium normal sulfates, pyrosulfates, and bisulfates which may be incorporated in the manner and in the amounts above disclosed in connection with the sodium sulfates.

The precipitation of the anthraquinone compound by dilution of the sulfuric acid solution thereof containing the alkali metal sulfate can be carried out with water and/or with ice or with less concentrated sulfuric acid, as for example, the filtrate from a previous carrying out of the process. Further, the dilution may be preformed at any desired temperature. The extent of dilution will depend upon the individual insoluble anthraquinone compound. In general, dilution is carried out to a sufficient extent to result in a concentration of less than about 30 per cent, and preferably less than 10 per cent, sulfuric acid in the resulting dilute solution.

I claim:

1. The improvement in the method of controlling the form of an anthraquinone vat dyestuff, which comprises dissolving an anthraquinone vat dyestuff selected from the group consisting of dichlor-iso-dibenzanthrone, 4,4'-di(benzoylamino)-1,1'-dianthrimide, and the crystalline yellow anthraquinone vat dyestuff which dyes cotton from a hydrosulfite vat a strong, bright yellow and which is obtainable by heating 2,6-diaminoanthraquinone with sulfur and benzal chloride, and an alkali-metal sulfate in sulfuric acid of sufficient concentration to completely dissolve said anthraquinone vat dyestuff, precipitating the anthraquinone vat dyestuff from the resulting solution by adding the solution to an aqueous diluting liquid, and filtering the resulting precipitate from the resulting dilute solution of sulfuric acid.

2. The improvement in the method of controlling the form of the crystalline yellow anthraquinone vat dyestuff which dyes cotton from a hydrosulfite vat a strong, bright yellow and which is obtainable by heating 2,6-diaminoanthraquinone with sulfur and benzal chloride, which comprises dissolving said anthraquinone vat dyestuff and an alkali-metal sulfate in sulfuric acid of sufficient concentration to completely dissolve said anthraquinone vat dyestuff, precipitating the anthraquinone vat dyestuff from the resulting solution by adding the solution to an aqueous diluting liquid, and filtering the resulting precipitate from the resulting dilute solution of sulfuric acid.

3. The improvement in the method of controlling the form of an anthraquinone vat dyestuff, which comprises dissolving 4,4'-di(benzoylamino)-1,1'-dianthrimide and an alkali-metal sulfate in sulfuric acid of sufficient concentration to completely dissolve said dianthrimide compound, precipitating the dianthrimide compound from the resulting solution by adding the solution to an aqueous diluting liquid, and separating the resulting precipitate by filtration from the resulting dilute solution of sulfuric acid.

4. The improvement in the method of controlling the form of an anthraquinone vat dyestuff, which comprises dissolving 4,4'-di(benzoylamino)-1,1'-dianthrimide and sodium sulfate in sulfuric acid of sufficient concentration to completely dissolve said dianthrimide compound, precipitating the dianthrimide compound from the resulting solution by adding the solution to an aqueous diluting liquid containing dissolved sodium nitrite, and separating the resulting precipitate by filtration from the resulting dilute solution of sulfuric acid.

5. The improvement in the method of controlling the form of an anthraquinone vat dyestuff, which comprises dissolving dichlor-iso-dibenzanthrone and an alkali-metal sulfate in sulfuric acid of sufficient concentration to completely dissolve said dichlor-iso-dibenzanthrone, precipitating the dichlor-iso-dibenzanthrone from the resulting solution by adding the solution to an aqueous diluting liquid, and filtering the resulting precipitate from the resulting dilute solution of sulfuric acid.

WILBERT A. HERRETT.